(12) United States Patent
Cong et al.

(10) Patent No.: US 8,566,500 B2
(45) Date of Patent: Oct. 22, 2013

(54) EXPANSION CARD AND MOTHERBOARD FOR SUPPORTING THE EXPANSION CARD

(75) Inventors: Wei-Dong Cong, Shenzhen (CN); Guo-Yi Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 56 days.

(21) Appl. No.: 13/270,803

(22) Filed: Oct. 11, 2011

(65) Prior Publication Data

US 2013/0073768 A1    Mar. 21, 2013

(30) Foreign Application Priority Data

Sep. 15, 2011 (CN) .......................... 2011 1 0273474

(51) Int. Cl.
*G06F 13/00* (2006.01)
(52) U.S. Cl.
USPC ........................................ 710/310; 713/100
(58) Field of Classification Search
USPC ........... 710/301–306; 713/100; 361/760, 798, 361/728
See application file for complete search history.

(56) References Cited

U.S. PATENT DOCUMENTS

2008/0065805 A1* 3/2008 Wu et al. ...................... 710/301
2010/0241799 A1* 9/2010 Schuette ...................... 711/104

* cited by examiner

*Primary Examiner* — Tim T Vo
*Assistant Examiner* — Kim Huynh
(74) *Attorney, Agent, or Firm* — Altis & Wispro Law Group, Inc.

(57) ABSTRACT

A motherboard assembly includes a motherboard and an expansion card. The motherboard includes an expansion slot, a hard disk drive (HDD) controller, a power connector, and a central processing unit (CPU). The expansion slot includes a protrusion, idle pins connected to the HDD controller, power pins connected to the power connector, signal pins connected to the CPU. The expansion card includes a circuit board. A storage unit, a display unit, and a power circuit connected to the storage unit and the display unit are all arranged on the circuit board. A notch is defined in a bottom side of the circuit board, to receive the protrusion. An edge connector is arranged on a bottom side of the circuit board and includes control signal pins connected to the storage unit, power pins connected to the power circuit, and bus signal pins connected to the display unit.

10 Claims, 2 Drawing Sheets

EXPANSION CARD AND MOTHERBOARD FOR SUPPORTING THE EXPANSION CARD

BACKGROUND

1. Technical Field

The present disclosure relates to an expansion card and a motherboard for supporting the expansion card.

2. Description of Related Art

Display requirement of a server is low, but storage capacity requirement of the server is very high. Thus, hard disk drives and serial advanced technology attachment dual in-line memory modules (SATA DIMMs) are used for adding storage capacity of the server. However, the hard disk drives and SATA DIMMs are expensive, and a plurality of racks for installing the hard disk drives and a plurality of memory slots for installing the SATA DIMMs will occupy precious space. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawing, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
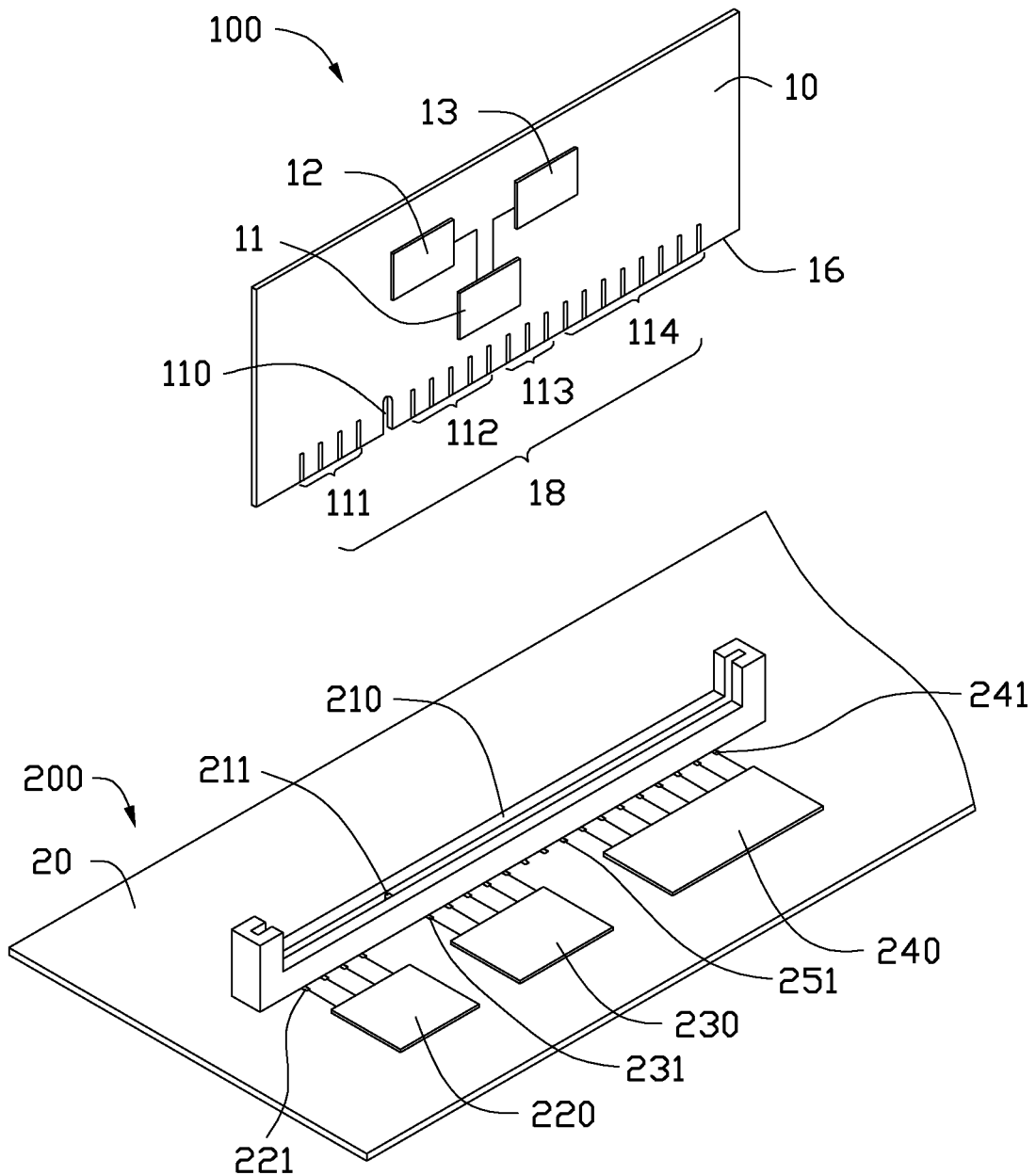
FIG. 1 is an exploded, isometric view of an expansion card and a motherboard for supporting the expansion card in accordance with an exemplary embodiment of the present disclosure.
Figure 2:
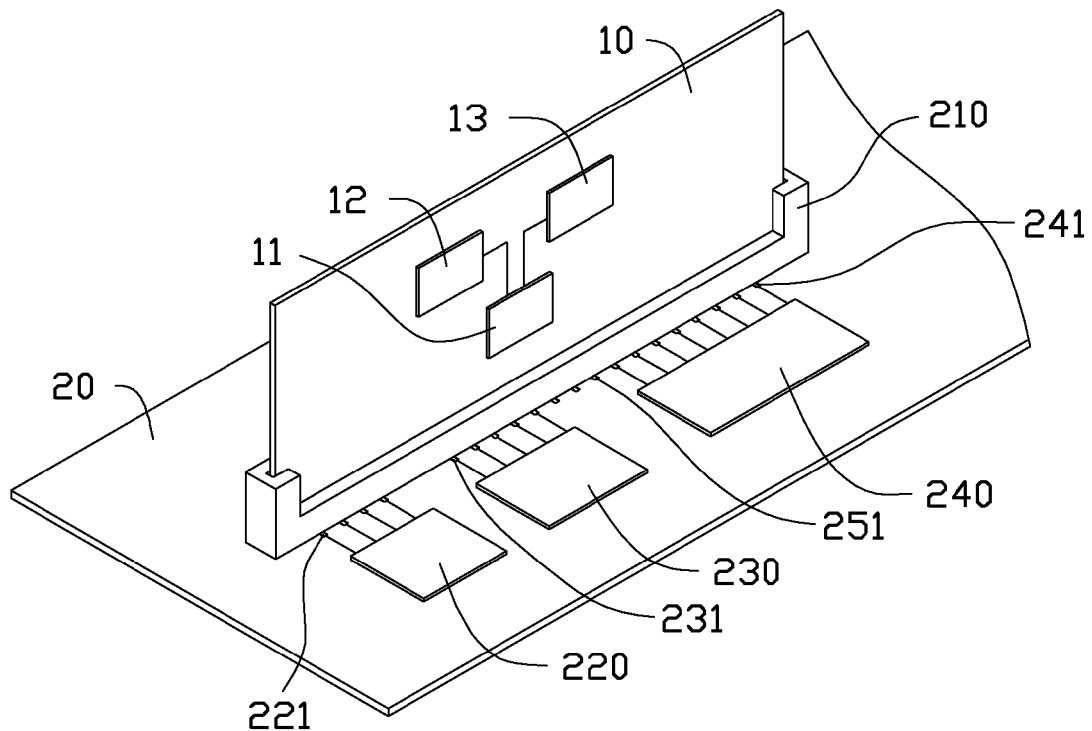
FIG. 2 is an assembled, isometric view of the expansion card and the motherboard of FIG. 1.

Referring to FIGS. 1 and 2, an expansion card 100 in accordance with an exemplary embodiment includes a substantially rectangular circuit board 10. A power circuit 11, a storage unit 12, and a display unit 13 are arranged on the circuit board 10. An edge connector 18 is arranged on a bottom side 16 of the circuit board 10. The edge connector 18 includes a plurality of control signal pins 111, a plurality of power pins 112, a plurality of ground pins 113, and a plurality of bus signal pins 114. A notch 110 is defined in the bottom side 16 of the circuit board 10 and located between the control signal pins 111 and the power pins 112. The control signal pins 111 include a pair of signal input pins and a pair of signal output pins, and are connected to the storage unit 12. The power pins 112 are connected to the power circuit 11. The bus signal pins 114 are connected to the display unit 13. The ground pins 113 are connected to a ground layer (not shown) of the circuit board 10. In one embodiment, the control signal pins 111 transmit serial advanced technology attachment (SATA) signals, and the bus signal pins 114 transmit peripheral component interconnection express (PCIe) signals. The power circuit 11 converts a voltage from the edge connector 18 and provides the converted voltage to the storage unit 12 and the display unit 13. The storage unit 12 is the same as a general hard disk drive for storing data of a motherboard 200. The display unit 13 is the same as a general display card for enabling the motherboard 200 to display information.

The motherboard 200 includes a circuit board 20. A hard disk drive (HDD) controller 220, a power connector 230, a central processing unit (CPU) 240, and an expansion slot 210 are all arranged on the circuit board 20. In one embodiment, the expansion slot 210 is a peripheral component interconnection express (PCIe) slot. The expansion slot 210 includes a protrusion 211 arranged in the expansion slot 210, a plurality of signal pins 241, a plurality of power pins 231, a plurality of ground pins 251, and a plurality of idle pins 221. In one embodiment, the number of the idle pins is four, and the four idle pins 221 are connected to the HDD controller 220. The power pins 231 are connected to the power connector 230. The ground pins 251 are connected to a ground layer (not shown) of the motherboard 200. The signal pins 241 are connected to the CPU 240. Namely, when the expansion card 100 is inserted into the expansion slot 210 through the edge connector 18, the protrusion 211 engages in the notch 110, the control signal pins 111 are connected to the idle pins 221, the power pins 112 are connected to the power pins 231, the ground pins 113 are connected to the ground pins 251, and the bus signal pins 114 are connected to the signal pins 241.

In use, when the motherboard 200 receives power, the motherboard 200 outputs a voltage to the power circuit 11 through the power connector 230, the power pins 231, and the power pins 112. The power circuit 11 converts the received voltage and provides the converted voltage to the storage unit 12 and the display unit 13. At the same time, the CPU 240 outputs a bus signal, such as a PCIe signal to the display unit 13 through the signal pins 241 and the bus signal pins 114, to enable the motherboard 200 to display information. The HDD controller 220 outputs a control signal, such as a SATA signal to the storage unit 12 through the idle pins 221 and the control signal pins 111, to enable the storage unit 12 to store data of the motherboard 200. Therefore, the storage capacity of the motherboard 200 is expanded. The expansion card 100 is price conscious and can save space.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. An expansion card comprising:
 a circuit board;
 a power circuit arranged on the circuit board, to receive a voltage and convert the received voltage;
 a storage unit arranged on the circuit board and connected to the power circuit, to receive the converted voltage from the power circuit and store data;
 a display unit arranged on the circuit board and connected to the power circuit, to receive the converted voltage from the power circuit and display information of a motherboard; and
 an edge connector and a notch arranged on a bottom side of the circuit board, to be inserted into an expansion slot of the motherboard, wherein the edge connector comprises a plurality of control signal pins connected to the storage unit, to receive a control signal from the motherboard and transmit the control signal to the storage unit for storing data, a plurality of power pins connected to the power circuit, to receive a voltage from the motherboard and transmit the voltage to the power circuit for converting the voltage, a plurality of ground pins, and a plurality of bus signal pins connected to the display unit, to receive a bus signal from the motherboard and transmitting the bus signal to the display unit to enable the display unit to display information of the motherboard.

2. The expansion card of claim 1, wherein the control signal pins comprise a pair of signal input pins and a pair of signal output pins.

3. A motherboard for supporting an expansion card, the motherboard comprising:
   a circuit board;
   a hard disk drive (HDD) controller mounted on the circuit board, to output a control signal;
   a power connector mounted on the circuit board, to output a voltage;
   a central processing unit (CPU) mounted on the circuit board, to output a bus signal; and
   an expansion slot mounted on the circuit board, to receive the expansion card, and the expansion slot comprising a protrusion arranged in the expansion slot, a plurality of idle pins connected to the HDD controller for receiving the control signal from the HDD controller and transmitting the control signal to the expansion card, a plurality of power pins connected to the power connector for receiving a voltage from the power connector and transmitting the voltage to the expansion card, a plurality of ground pin, and a plurality of signal pins connected to the CPU for receiving the bus signal from the CPU and transmitting the bus signal to the expansion card.

4. The motherboard of claim 3, wherein the number of the idle pins are four.

5. The motherboard of claim 4, wherein the idle pins comprise a pair of signal input pins and a pair of signal output pins.

6. The motherboard of claim 3, wherein the expansion slot is a peripheral component interconnection express slot.

7. A motherboard assembly comprising:
   a motherboard comprising a first circuit board, an expansion slot mounted on the first circuit board, a hard disk drive (HDD) controller mounted on the first circuit board, a power connector mounted on the first circuit board, and a central processing unit (CPU) mounted on the first circuit board, the expansion slot comprising a protrusion, a plurality of idle pins electrically connected to the HDD controller, a plurality of first power pins electrically connected to the power connector, a plurality of first ground pins, and a plurality of signal pins connected to the CPU; and
   an expansion card comprising a second circuit board, a power circuit arranged on the second circuit board, a storage unit arranged on the second circuit board and connected to the power circuit, a display unit arranged on the second circuit board and connected to the power circuit, and an edge connector and a notch set on a bottom side of the second circuit board to be detachably engaged in the expansion slot of the motherboard, the edge connector comprising a plurality of control signal pins connected to the storage unit, a plurality of second power pins connected to the power circuit, a plurality of second ground pins, and a plurality of bus signal pins connected to the display unit;
   wherein in response to the edge connector of the expansion card being engaged in the expansion slot of the motherboard, the protrusion is engaged in the notch, the control signal pins of the expansion card are connected to the idle pins of the expansion slot, the second power pins of the expansion card are connected to the first power pins of the expansion slot, the second ground pins of the expansion card are connected to the first ground pins of the expansion slot, and the bus signal pins of the expansion card are connected to the signal pins of the expansion slot.

8. The motherboard assembly of claim 7, wherein the control signal pins of the expansion card comprises a pair of signal input pins and a pair of signal output pins.

9. The motherboard assembly of claim 7, wherein the number of the idle pins of the expansion slot are four, and the idle pins comprise a pair of signal input pins and a pair of signal output pins.

10. The motherboard assembly of claim 7, wherein the expansion slot is a peripheral component interconnection express slot.

* * * * *